Dec. 11, 1928.

G. W. SINCLAIR 1,694,834

MECHANISM FOR TRANSMITTING MOVEMENT

Filed May 8, 1925

Inventor
G. W. Sinclair
By Marks Clerk
Attys.

Patented Dec. 11, 1928.

1,694,834

UNITED STATES PATENT OFFICE.

GEORGE WILLIAM SINCLAIR, OF ETON, ENGLAND.

MECHANISM FOR TRANSMITTING MOVEMENT.

Application filed May 8, 1925, Serial No. 28,903, and in Switzerland June 1, 1924.

This invention relates to mechanism for transmitting motion.

It is characterized by the feature that it comprises a driving and a driven member which turn about different geometrical axes, and also a connecting member which is interposed between the driving and driven members and is connected to them by two pivotal connections one at least of which is a universal joint, the point of intersection of the two geometrical axes of rotation of the universal joint being at a distance from the axis of rotation of the driven or the driving member to which it belongs.

The accompanying drawing illustrates diagrammatically a form of construction of the invention, by way of example.

One of the members mentioned in the introductory paragraph consists of a driving shaft $a$ carried in bearings $b$, $c$ in which it can turn but not slide in an axial direction; it is provided at one end with a driving crank $d$, and at the other with a crank $e$ perpendicular to the horizontal axis $f$ of the shaft $a$. The other or driven member is formed by a shaft $g$, carried in bearings $h$, $i$ in which it may both turn about a horizontal axis $j$ and move in an axial direction; the axis $j$ is in the same horizontal plane as the axis $f$. Between the crank $e$ of the shaft $a$ and the shaft $g$ is interposed a link $k$ forming the connecting member and connected to each of them by a pivotal joint. It comprises two cross members $w$, $x$ one of which, $w$, can turn about the axis $v$ of the crank, but cannot slide upon this crank $e$ and the other of which, $x$, is fixed upon the shaft $g$. It also includes two longitudinal members $y$, $z$ which can turn on the members $w$, $x$ along the transverse axes $l$, $m$, the first relatively to the axis $j$, the second relatively to the axis $v$. The axis $m$ is situated at a certain distance from the axis $f$; while the axis $l$ cuts the axis $j$. The pivotal connections $e$, $w$, $y$, $z$ constitute therefore a universal joint, while $x$, $y$, $z$ is a simple joint.

The bearings $b$, $c$ are carried by a plate $n$ pivoted at $o$ upon a base plate $q$ along a vertical axis $p$ which cuts the axis $f$ and is in the vertical plane which contains the curve described by the centre of the pivotal connection $e$, $w$, $y$, $z$ when the shaft $a$ is turned about the axis $f$. In the plate $n$ is formed a slideway $r$ which forms an arc of a circle, and through which passes a screwthreaded rod $s$ provided with a butterfly nut $t$; the latter enables the plate $n$ to be fixed in different positions.

Figure 1:
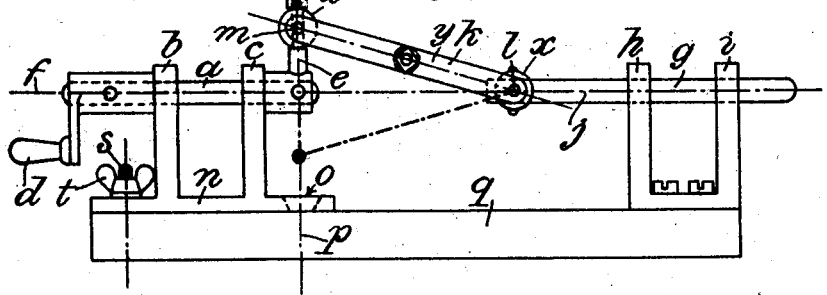
Figures 1 and 2 are an elevation and a plan respectively.
Figure 2:
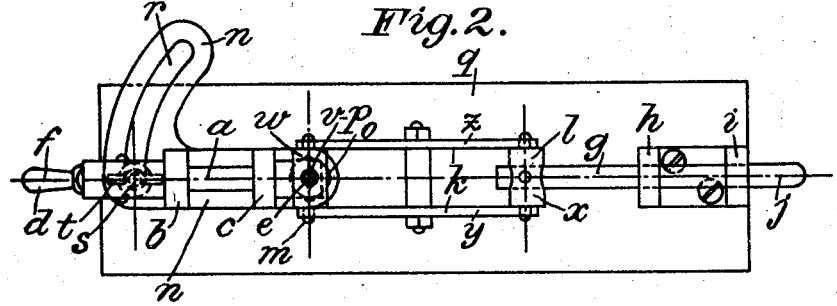

This form of construction operates in the following manner:

When the two axes $f$, $j$ of the shafts $a$, $g$ coincide as shown in Figures 1 and 2, the rotation communicated to the crank $d$ is transmitted as such to the shaft $g$, that is to say that the latter has at any moment the angular velocity of the shaft $a$. Moreover it makes no axial movement.

Figure 4:
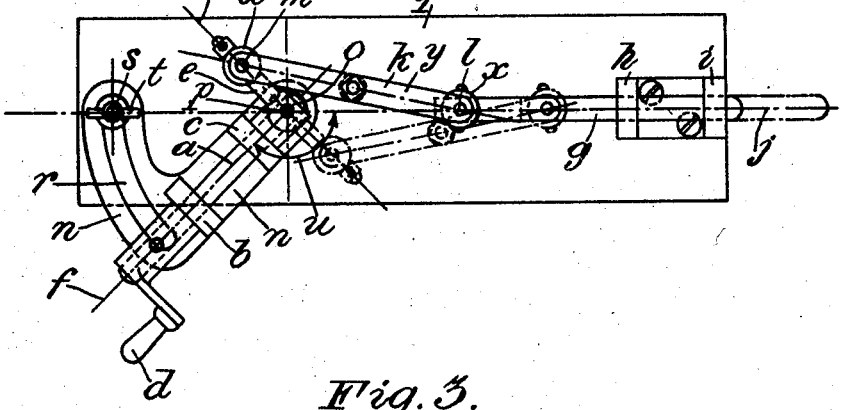
Figures 3 and 4 are also an elevation and a plan, but with some of the parts in different positions.
Figure 3:
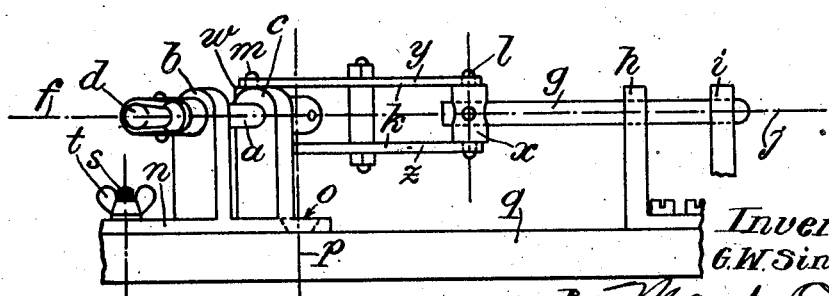

Let it be assumed now that the axis $f$ is brought by rotating the plate $n$, into the position shown in Figures 3 and 4 and where the axis $f$, instead of coinciding with the axis $j$ makes a certain angle $u$ with the latter.

During each turn of the crank $d$ the point of intersection of the axis $m$ and of the longitudinal axis $v$ of the crank $e$ describes a circle which is in a vertical plane which is oblique relatively to the axis $j$ and no longer perpendicular. As a consequence the shaft $g$, in addition to its movement of rotation, receives an axial to and fro motion. It must be noted that if a uniform angular velocity is given to the crank $d$ the angular velocity of the shaft $g$ varies during each turn between maxima and minima; there are two points 180° apart at which it reaches the same maximum value, and two points also 180° apart at which it reaches the same minimum value; a point where the velocity is a maximum is 90° apart from a point where this velocity is a minimum.

The amplitude of the axial movement of the shaft $g$ varies between O and an upper limit according to the angle $u$ made by the axes $f$, $j$, with each other. By displacing the plate $n$ any of the values comprised between these two limits may be obtained.

If the shaft $g$ is now considered as the driving shaft and the shaft $a$ as the driven shaft and a reciprocating movement is given to the shaft $g$, the shaft $a$ commences to turn. Two dead centres occur which are produced each time the direction of axial movement of the shaft $g$ is changed, but the movement of the shaft $a$ will nevertheless be continuous if this shaft $a$, due to its own mass or due to a mass to which it is connected, such as a flywheel, can pass these dead centres.

The form of construction shown is entirely diagrammatic, so that the mechanism may be constructed by means of different parts and members.

The connecting member $k$ may be connected to the shaft $g$, by means of a universal joint instead of by means of a simple joint; in this case the axes of rotation $f$, $j$ may be in the same horizontal plane or in different horizontal planes and it is no longer necessary for the curve described by the point of intersection of the two axes of rotation $v$, $m$ of the pivotal connection $e$, $w$, $y$, $z$ to be in the vertical plane containing the axis $p$.

The crank $e$ and the axis $v$ need not be perpendicular to the axis $f$. In this case, if the connecting member $k$ is connected to the shaft $g$ by means of a simple joint, the prolongation of the axis $j$ of the shaft $g$, the axis $f$ of the shaft $a$, and the axis $v$ of the crank $e$ must intersect at the same point. The angular velocity of the driven shaft $g$ will then vary periodically between two upper limits which are reached at two points 180° apart, one of which is greater than the other, and two equal lower limits which are both reached at points which make an equal angle with one of the other limits, but which are not 180° apart themselves The member $k$ may be made in one single piece.

The mechanism may serve for example for actuating mixers where the movement of rotation and an axial movement are required at the same time, and also for actuating water pumps, vacuum pumps, air compressors and the like, where the combination of the axial movement and the movement of rotation will be utilized for enabling the fluid to enter and leave through ports provided in the pistons and the walls of the cylinders. It may also be used for transforming the reciprocating movement of a member such as a piston into a rotary motion; in this case the shaft $g$ is the driving member.

The fact that the angular velocity of the shaft $g$ varies during each turn may be utilized for certain applications, for example for actuating electro-magnetic ignition machines where it is an advantage to have at certain moments a greater angular velocity; however, in this case the shaft of the machine must not make an axial movement; the connecting member will therefore be made of two or more members sliding longitudinally relatively to each other, so that the length of the member will vary during each turn of the driving member and the shaft of the machine remain motionless axially.

What I claim is:

1. In a mechanism for transmitting movement, in combination, a driving member, a driven member, said members being adapted for rotation around different geometrical axes, a connecting link between said members secured to each by a joint at least one of which is a universal joint, the point of intersection of the two geometrical axes of rotation of the one joint being at a distance from the axis of rotation of its member and the point of intersection of the geometrical axes of rotation of the other joint being in the axis of rotation of its member.

2. In a mechanism for transmitting movement, in combination, a driving member, a driven member, said members being adapted for rotation around different geometrical axes, one of said members being adapted to be turned about an axis transverse to its axis of rotation, a connecting link between said members secured to each by a joint, at least one of which is a universal joint, the point of intersection of the two geometrical axes of rotation of the one joint being at a distance from the axis of rotation of its member and the point of intersection of the geometrical axes of rotation of the other joint being in the axis of rotation of its member.

3. In a mechanism for transmitting movement in which a primary rotary movement is transformed into a combined rotary and reciprocatory movement or vice versa, in combination, a driving member, a driven member, said members being adapted for rotation about different geometrical axes, and one of said members being adapted also for reciprocation, a connecting link between said members, a universal joint between said link and rotatable member remote from the axis of said member and a joint between said link and reciprocatable member having its geometrical axis intersecting the axis of said reciprocatable member.

In testimony whereof I have affixed my signature.

GEORGE WILLIAM SINCLAIR.